(No Model.) 3 Sheets—Sheet 1.
B. L. STOWE.
HOSE RACK.
No. 532,403. Patented Jan. 8, 1895.
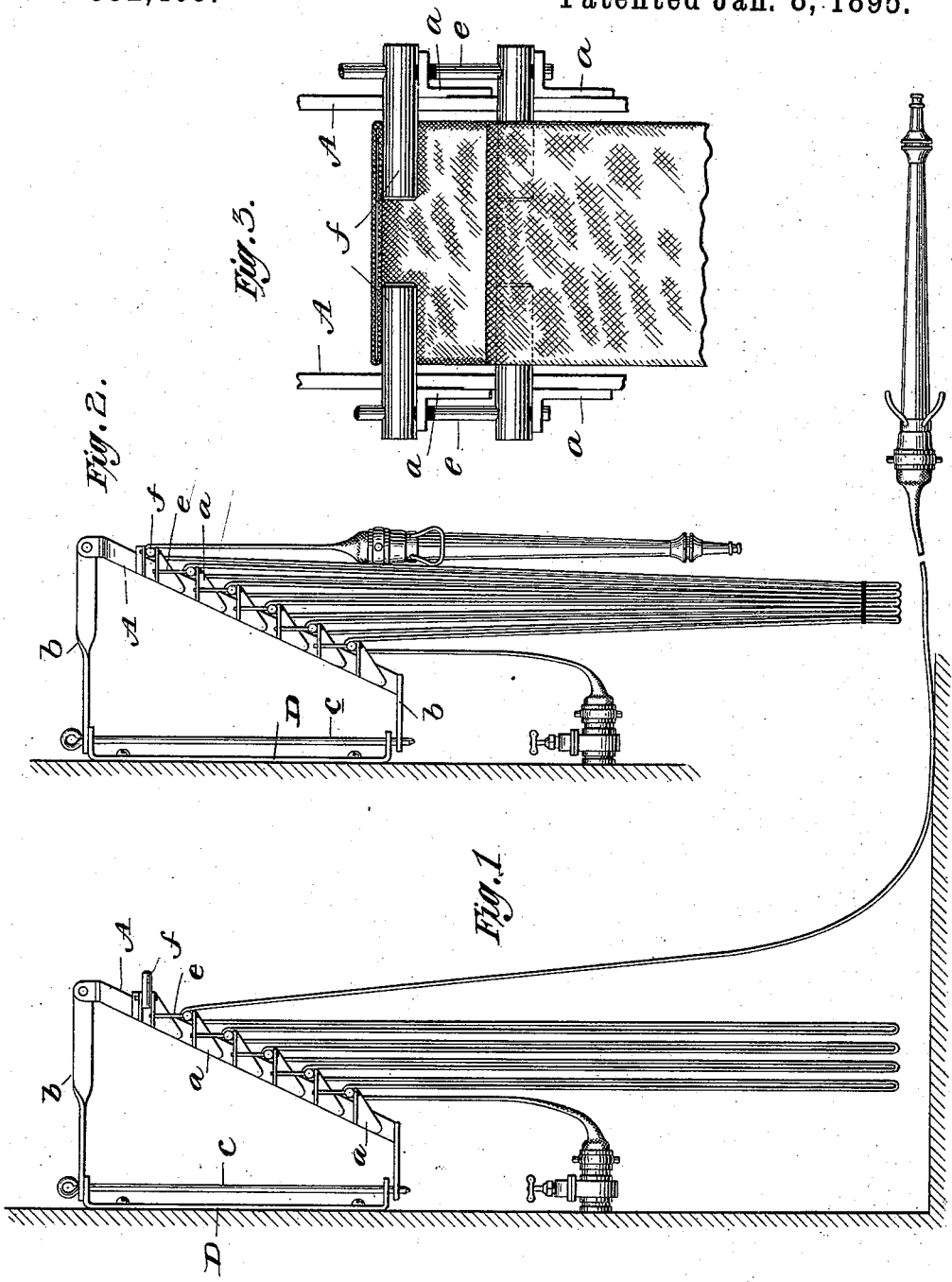
Witnesses
Raphael Netter
L. C. Hills
Inventor
Benjamin L. Stowe
By his Attorney (No Model.) 3 Sheets—Sheet 2.
B. L. STOWE.
HOSE RACK.
No. 532,403. Patented Jan. 8, 1895.
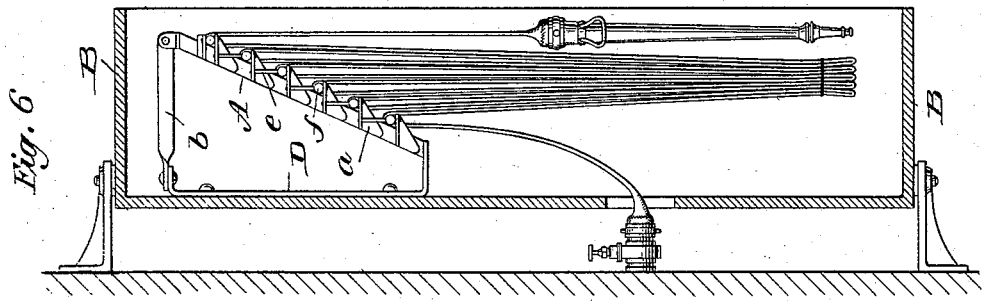
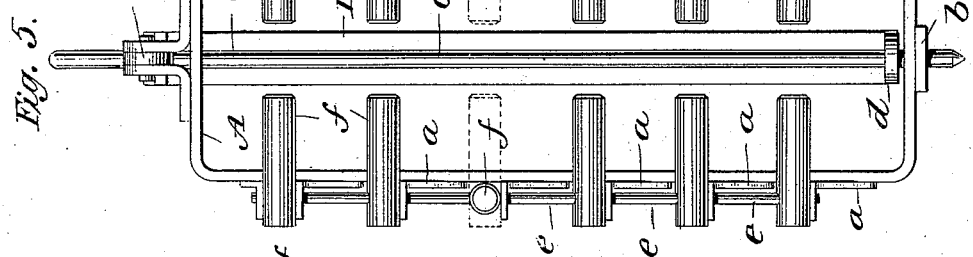
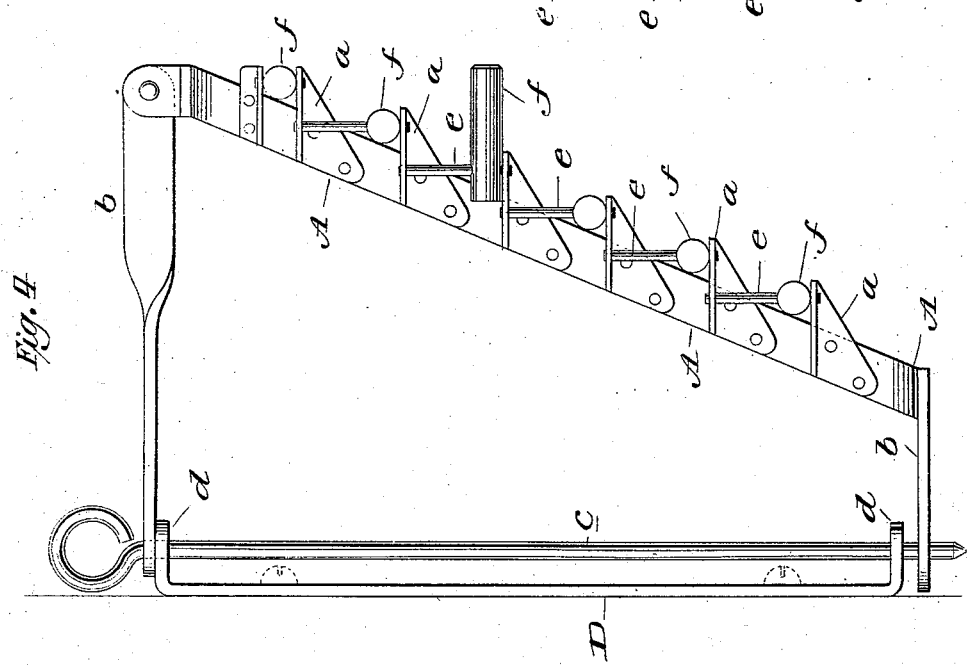
Witnesses
Raphael Netter
L. C. Hills
Inventor
Benjamin L. Stowe
By his Attorney (No Model.) 3 Sheets—Sheet 3.
B. L. STOWE.
HOSE RACK.
No. 532,403. Patented Jan. 8, 1895.
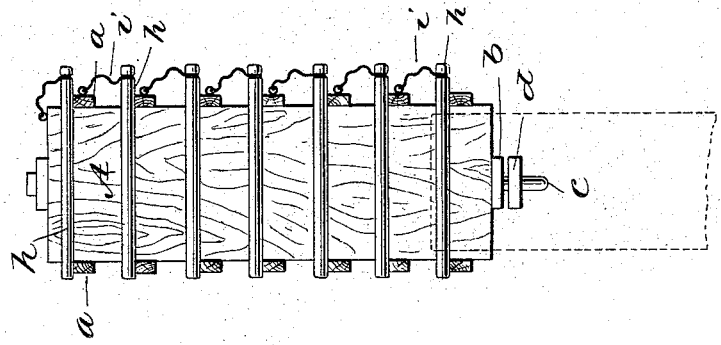
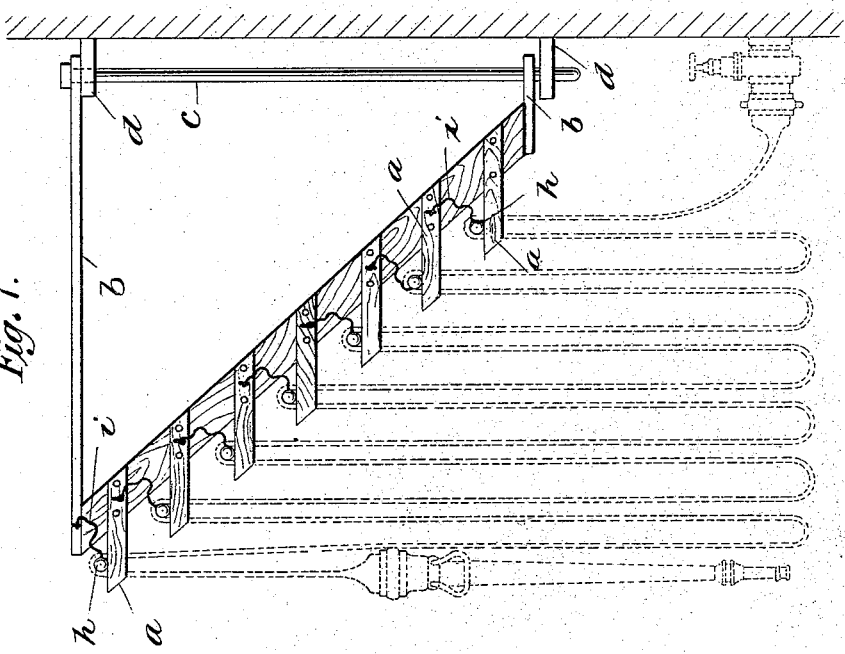
Witnesses
Raphael Netter
L. C. Hills
Inventor
Benjamin L. Stowe
By his Attorney

UNITED STATES PATENT OFFICE.

BENJAMIN L. STOWE, OF JERSEY CITY, NEW JERSEY.

HOSE-RACK.

SPECIFICATION forming part of Letters Patent No. 532,403, dated January 8, 1895.

Application filed June 7, 1894. Serial No. 513,821. (No model.)

*To all whom it may concern:*

Be it known that I, BENJAMIN L. STOWE, of Jersey City, in the county of Hudson and State of New Jersey, have invented certain new and useful Improvements in Hose-Racks, of which the following is a specification.

The hose rack in which my invention is embodied is for supporting hose intended for fire protective purposes.

The object is to support the hose in such a manner that it will dry readily when suspended, and can be run off easily and without danger of catching or kinking when required for use. To this end I combine with the rack frame provided with a series of supporting ears or lugs, hose supporting pins, which extend horizontally and crosswise of the frame and are upheld by the ears or lugs thereon, and are readily movable outwardly or in the direction of the front of the frame, so as to yield to any outward pull upon the loops of hose held by them, and in so doing to release the hose. It is this feature which mainly characterizes my invention.

In the accompanying drawings, to which I shall now refer for a better understanding of my improvements—Figure 1 is a side elevation of a hose rack embodying my improvements in their preferred form. In this figure the rack is represented as having a section of hose partially suspended from it. Fig. 2 is a like elevation of the same structure showing a full section of hose with nozzle attached suspended from the rack, together with an elastic band about the bottom coils or loops of the hose to hold the same closely together. This band is usually put about the hose after the hose has been thoroughly dried in cases where it has been wet. Fig. 3 is a front elevation on enlarged section of a portion of the rack with one of the loops of hose in section. Fig. 4 is a side elevation, and Fig. 5 is a front elevation on enlarged scale of the rack divested of hose. Fig. 6 is a sectional side elevation of the rack provided with an inclosing case or box for protecting the hose from dirt or injury. Figs. 7 and 8 are respectively side and front elevations of a modified form of the rack.

The body of the rack consists of a quadrangular, oblong frame A provided with side ears or lugs $a$ which may be either riveted to the frame, as shown in the drawings, or cast in one with it. This frame is set in a slanting position, its upper end overhanging its lower end, and is thus held by arms $b$ hung upon a joint pin $c$ which passes through the ears $d$ of a bracket D, which may be secured to the side wall of a building, or any other convenient support. The rack as a whole can thus swing upon the joint pin as a pivot.

The ears or lugs $a$ overhang each other, the one above being set a little forward of the one below, thus forming a series of steps. Between each step and the one next above extends a pin $e$ and upon these pins are pivoted the large horizontal pins $f$ which swing upon the pins $e$ and are intended to support the loops or coils of hose. One loop is supported upon each pair of pins, the pins of the pair extending toward each other in the same plane but from opposite sides of the rack frame, as shown in Figs. 3 and 5.

To suspend hose upon this rack the two opposite lowest pins are swung out far enough to permit the loop of hose to pass between their ends. The pins are then swung inward until they are in line with one another. The loop of hose is then dropped over them. Another loop of hose is then applied to the pair of pins next above and so on until the rack is filled. So long as the hose hangs in a vertical position it is safely and securely held, but whenever its delivery or nozzle end is drawn away in a direction to swing two pins out at a sufficient angle a bight of hose will be released and permitted to drop down and the rack will thus deliver as much hose as required for use.

One or more elastic bands may be put about the loops of hose. These bands can sometimes be fastened to the side walls to hold the hose compactly together. The bands, however, are fragile enough to be broken by a slight pull upon the hose.

When it is desired to thoroughly protect the hose from dirt and injury the rack, as shown in Fig. 6, can be fastened to a box B of required form and size. The box is hinged to its support so that it can swing in the same manner as the rack itself in the preceding figures. The front of the box may be provided with a hinged cover when it is desired to entirely inclose the hose, but it is usually preferable to leave some openings for ventilation.

I sometimes employ the modified form of rack illustrated in Figs. 7 and 8 where the hose is very heavy and requires pins of large diameter for its support. In this form of rack the swinging rack frame is hung in a slanting position as before, and is also provided with a similar series of horizontal steps for support of the hose carrying cross pins. The pins in this case however, are large round pins $h$, which are laid horizontally so as to rest upon the steps but are loose thereon so that they can readily be drawn to the front until they drop from the steps. Each pin is held to the frame by a cord $i$, secured at one end to its pin and at the other end to the rack frame. To put hose upon this rack a bight of the hose is placed between the two lowermost steps and a pin $h$ is pushed through the bight so that its ends will rest upon the step. The desired length of hose is then dropped down and a second bight of hose is suspended between the second pair of steps in the same manner as the first bight was suspended. When it is desired to use the hose from this rack the discharge or nozzle end is drawn away thus exerting a slight pull upon the lowermost pin sufficient to cause it to slip forward and drop off from its supporting steps and thus release the first bight of hose. After the hose slips from the pin the latter remains suspended by means of the cord or chain that secures it to the frame of the rack.

I prefer, as above stated, the form of rack illustrated in Figs. 1 to 6 inclusive, but both of the forms possess the same advantages. These are that the hose can be readily dried when suspended from the rack. Pins of sufficient size can be used to prevent sharp bends in the hose. The hose can never come off from the rack faster than it is withdrawn, nor can it come in a bunch, as it sometimes does from ordinary racks upon which it is piled, nor can it continue to run off from the momentum already gained after the pull upon the hose has been stopped, as it may from a revolving reel. It cannot be injuriously affected if water is turned into the hose before the latter has been withdrawn from the rack.

Having described my invention and the best way now known to me of carrying the same into effect, what I claim, and desire to secure by Letters Patent, is as follows:

1. A hose rack comprising a swinging frame, a series of side steps or lugs set on an incline, so as to permit loops of hose to be placed side by side in the frame, and hose carrying cross pins supported by said steps or lugs but movable outwardly or to the front, so as to release the bights of hose hung upon them, substantially as and for the purposes hereinbefore set forth.

2. A hose rack comprising a swinging frame, and a series of steps $a$, in combination with cross pins $b$ carried by said steps and hinged thereto so as to turn upon a vertical axis, substantially as set forth.

3. A hose rack frame having a series of side steps or lugs set at an incline to permit loops of hose to be placed side by side in the frame, in combination with hose carrying cross pins supported by said steps or lugs but movable outwardly or to the front to release the bights of hose hung upon them, substantially as and for the purposes hereinbefore set forth.

In testimony whereof I have hereunto set my hand, before two subscribing witnesses, this 6th day of June, 1894.

BENJAMIN L STOWE.

Witnesses:
GEO. O. WIES,
WILLIAM F. WIES.